(12) United States Patent
Ryan et al.

(10) Patent No.: US 10,348,070 B1
(45) Date of Patent: Jul. 9, 2019

(54) KIT FOR RUNNING WIRE AND CABLE

(71) Applicants: Wesley Norris Ryan, Nutley, NJ (US); Christopher Paul Witthaut, Reading, PA (US)

(72) Inventors: Wesley Norris Ryan, Nutley, NJ (US); Christopher Paul Witthaut, Reading, PA (US)

(73) Assignee: Wesbit Designs, LLC, Nutley, NJ (US)

( * ) Notice: Subject to any disclaimer, the term of this patent is extended or adjusted under 35 U.S.C. 154(b) by 54 days.

(21) Appl. No.: 15/643,836

(22) Filed: Jul. 7, 2017

Related U.S. Application Data (60) Provisional application No. 62/360,945, filed on Jul. 11, 2016.

(51) Int. Cl.
*H02G 1/06* (2006.01)

(52) U.S. Cl.
CPC ..................... *H02G 1/06* (2013.01)

(58) Field of Classification Search
CPC ................. H02G 1/085; H02G 1/06
USPC .................. 254/133 R, 134, 134.7
See application file for complete search history.

(56) References Cited

U.S. PATENT DOCUMENTS

| | | | |
|---|---|---|---|
| 1,204,673 A | 11/1916 | Locke | |
| 1,408,802 A | 3/1922 | Crocker et al. | |
| 1,598,293 A * | 8/1926 | Luck | E03F 9/002 15/104.31 |
| 2,711,199 A | 6/1955 | Salsberg | |
| 2,750,152 A * | 6/1956 | Schinske | H02G 1/083 174/5 R |
| 3,006,223 A * | 10/1961 | Broussard | B23B 47/28 144/106 |
| 3,016,073 A * | 1/1962 | Broussard | B23B 45/00 408/110 |
| 3,035,817 A * | 5/1962 | Wilson | H02G 1/085 254/134.3 FT |
| 3,110,478 A * | 11/1963 | Bostick | F16C 1/20 15/104.33 |
| 3,365,987 A | 1/1968 | Heller et al. | |
| 3,611,549 A | 10/1971 | Pope | |

(Continued)

OTHER PUBLICATIONS

Anonymous, Flex Bit Tips and Tricks—How to Use a Flexible Installer Bit, http://www.licensedelectrician.com/Store/ET/Flex-Bit-Tips-and-Tricks.htm, May 20, 2016.

(Continued)

*Primary Examiner* — George B Nguyen
(74) *Attorney, Agent, or Firm* — Werschulz Patent Law, LLC; Patricia P. Werschulz, Esq.

(57) ABSTRACT

A kit and a method for using same for pulling wire or cable through a wall or ceiling comprising a drill bit guide, a fish head rod with at least one extension, a bushing and further comprising a drill adapted for right angle drilling, at least one drill bit with at least one drill bit extension. The drill bit guide sits inside a ceiling opening for a lighting fixture has a channel that guides a drill bit at a consistent and set distance above the ceiling interior surface. The guide has a rim guard to protect the ceiling opening edge. The fish head rod and extensions have a guide line to orient a user peering from below the ceiling and a guide strip to keep the fish head rod at a consistent and set distance above the ceiling interior surface.

11 Claims, 8 Drawing Sheets

(56) References Cited

U.S. PATENT DOCUMENTS

| | | | |
|---|---|---|---|
| 3,697,188 A | 10/1972 | Pope | |
| 3,858,848 A * | 1/1975 | MacFetrich | H02G 1/081 15/104.33 |
| 4,023,907 A * | 5/1977 | Chang | B23B 49/026 356/138 |
| 4,597,185 A * | 7/1986 | Ury | B25H 1/0064 33/628 |
| 5,185,843 A * | 2/1993 | Aberson | G02B 6/4452 385/134 |
| 5,395,188 A | 3/1995 | Bailey et al. | |
| 5,833,693 A * | 11/1998 | Abrahami | A61B 17/176 606/96 |
| 5,938,180 A * | 8/1999 | Walsten | H02G 1/083 254/134.3 FT |
| 6,142,868 A * | 11/2000 | Pfanstiehl | A46B 11/001 15/169 |
| 6,279,877 B1 * | 8/2001 | Davis | H02G 1/083 254/134.3 FT |
| 6,511,266 B1 | 1/2003 | Groot | |
| 6,997,083 B1 * | 2/2006 | Olszewski | B25B 13/48 29/237 |
| 7,124,882 B1 * | 10/2006 | Jadydy | B08B 9/021 206/234 |
| 7,128,502 B1 * | 10/2006 | Hirko | B23B 47/281 408/115 R |
| 8,770,898 B2 | 7/2014 | Nordlin | |
| 2001/0029676 A1 * | 10/2001 | Biglin | G01B 3/02 33/511 |
| 2004/0013483 A1 * | 1/2004 | Thomsen | B23B 51/08 408/226 |
| 2006/0065883 A1 * | 3/2006 | Radle | B65H 75/28 254/134.3 FT |
| 2007/0132253 A1 * | 6/2007 | Santayana | A01K 97/06 294/2 |
| 2009/0014697 A1 * | 1/2009 | Welker | H02G 1/00 254/134.3 R |
| 2009/0136184 A1 * | 5/2009 | Abernathy | G02B 6/381 385/80 |
| 2010/0048108 A1 * | 2/2010 | Stott | B24B 23/005 451/344 |
| 2010/0071934 A1 * | 3/2010 | Carter | H02G 1/00 174/152 G |
| 2011/0186794 A1 * | 8/2011 | Petti | H02G 1/08 254/134.3 R |
| 2012/0305868 A1 * | 12/2012 | Callahan | H02G 3/12 254/134.3 R |
| 2012/0309273 A1 * | 12/2012 | Popov | B24D 15/023 451/57 |
| 2013/0023881 A1 * | 1/2013 | Cook | A61B 17/17 606/80 |
| 2013/0155668 A1 * | 6/2013 | Rennecker | F21L 4/04 362/191 |

OTHER PUBLICATIONS

Anonymous, New Techniques for Installing Security/Fire-Alarm Systems in Existing Business;http://constructionmanuals.tpub.com/14027/css/New-Techniques-for-Instal . . . Jun. 20, 2016.

Anonymous, Super Rod SRFD1.2X5-10 Flexi Drill Kit: Amazon.co.uk: DIY & Tools; https://www.amazon.co.uk/Super-Rod-SRFD1-2X5-10-Flexi-Drill/dp/B . . . May 20, 2016.

* cited by examiner

KIT FOR RUNNING WIRE AND CABLE

CROSS-REFERENCE TO RELATED APPLICATIONS

This application is a nonprovisional utility application of the provisional patent application Ser. No. 62/360,945 filed in the United States Patent Office on Jul. 11, 2016 and claims the priority thereof and is expressly incorporated herein by reference in its entirety.

TECHNICAL FIELD

The present disclosure relates generally to a kit for running wire and cable. More particularly, the present disclosure relates to a kit for running wire and cable through ceilings and walls in existing buildings.

BACKGROUND

Running wires and cables through existing buildings presents a different challenge than running the same in new construction.

In new construction, wires and cables are put in place during the construction process before the walls are finished. Particularly in the traditional methods of construction used in North America, joists and studs are put in place before plaster or plasterboard are attached to form the ceiling and walls. The electrician or installer can easily see the joists and studs and measure where to drill holes before the wire or cable is run.

Once construction is complete, it is more challenging to run cable and wire through ceilings and walls without damage. In particular, holes must be made in the ceiling close to the joists in order to insert a drill to create openings in the joists for the wire or cable to pass through.

For example, a homeowner wishes to have recessed lighting installed in a ceiling as part of a redecorating or remodeling project. Typically used are lighting fixtures called high hats—often called can lights—that are flush with the finished ceiling. The fixture itself extends into the space above the ceiling and the wiring extends into that space and must connect with a wall switch and other lights in the series. The challenge is the ceiling joists that support the ceiling block the path of the wiring and must be drilled out. Aligning the holes properly in the joists above the ceiling without extensive damage to the ceiling is very difficult.

Current practice is to create additional openings in the ceiling in order to access the joints and drill holes. Additionally, it takes great skill to be sure that the holes are properly aligned with each other and at the same distance above the ceiling. The electrician also needs to make sure that drill does not drill into other structures such as gas or water lines or other wiring. The electrician then has to patch the ceiling and paint after the wire has been run and lighting installed. Often times the patch is visible despite best efforts.

While these methods may be suitable for the particular purpose employed, or for general use, they would not be as suitable for the purposes of the present disclosure as disclosed hereafter.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a kit for pulling wire or cable through a wall or ceiling. Accordingly, an aspect of an example embodiment in the present disclosure provides a kit comprising at least one drill bit guide, a fish head rod with at least one extension and at least one bushing.

Another aspect of an example embodiment in the present disclosure is to provide a kit for pulling wire or cable through a wall or ceiling. Accordingly, another aspect of an example embodiment in the present disclosure provides a kit further comprising a drill adapted for right angle drilling, at least one drill bit with at least one drill bit extension.

A further example embodiment in the present disclosure is to provide a drill bit guide that produces a plurality of aligned holes in a plurality of ceiling joists. Accordingly, an aspect of an example embodiment in the present disclosure provides a drill bit guide that sits inside a ceiling opening for a lighting fixture that has a channel that guides a drill bit at a consistent and set distance above the ceiling interior surface.

Yet another aspect of an example embodiment in the present disclosure is to provide a fish head rod and extensions for pulling wire or cable through a ceiling that is consistent oriented at a set distance above the ceiling interior surface. Accordingly, another aspect of an example embodiment in the present disclosure provides a fish head rod and extensions having a guide strip that keeps the fish head rod at a consistent and set distance above the ceiling interior surface and a guide line that when the extensions attach to the fish head rod the line is continuous.

The present disclosure describes a kit and a method for using same for pulling wire or cable through a wall or ceiling comprising a drill bit guide, a fish head rod with at least one extension, a bushing and further comprising a drill adapted for right angle drilling, at least one drill bit with at least one drill bit extension. The drill bit guide sits inside a ceiling opening for a lighting fixture that has a channel that guides a drill bit at a consistent and set distance above the ceiling interior surface. The guide has a rim guard to protect the ceiling opening edge. The fish head rod and extensions have a guide line to orient a user peering from below the ceiling and a guide strip to keep the fish head rod at a consistent and set distance above the ceiling interior surface.

The present disclosure addresses at least one of the disadvantages described hereinabove. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 4:
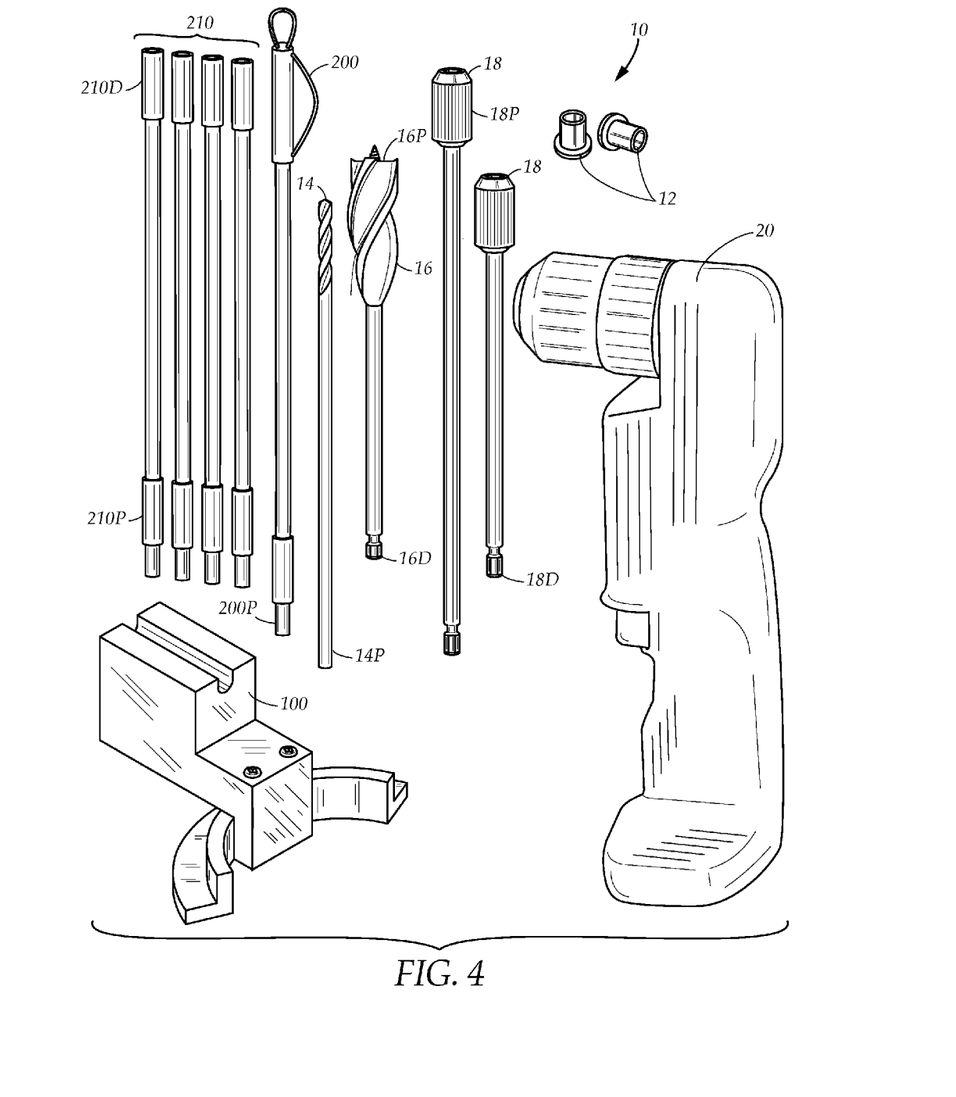
FIG. 4 is a perspective view of an example embodiment of a kit for running wire and cable.

FIG. 4 illustrates an example embodiment of a kit 10 for running wire or cable through ceilings and walls. The kit comprises a drill bit guide 100, described in detail hereinbelow, a fish head rod 200 with at least one extension 210, described in detail hereinbelow, and at least one bushing 12.

Throughout this disclosure, when the term "wire" is used, it includes electrical wiring, Ethernet cable, telephone wires, coaxial cable, cords and other types of wires and cables known to those of ordinary skill in the art.

In a further example embodiment, the kit further comprises at least one drill bit 14, 16, at least one drill bit extension 18 and a drill 20 with a selectively attachable right angle adapter. These devices are well known to those of ordinary skill.

The drill bit is preferably a corkscrew paddle bit 16, also well known to those of ordinary skill.

In another example embodiment, the kit 10 still further comprises at least one clamp to secure the drill bit guide. Clamps, such as "c" clamps, "g" clamps, spring clamps and bar clamps are well known to those of ordinary skill are not illustrated or discussed.

Figure 1A:
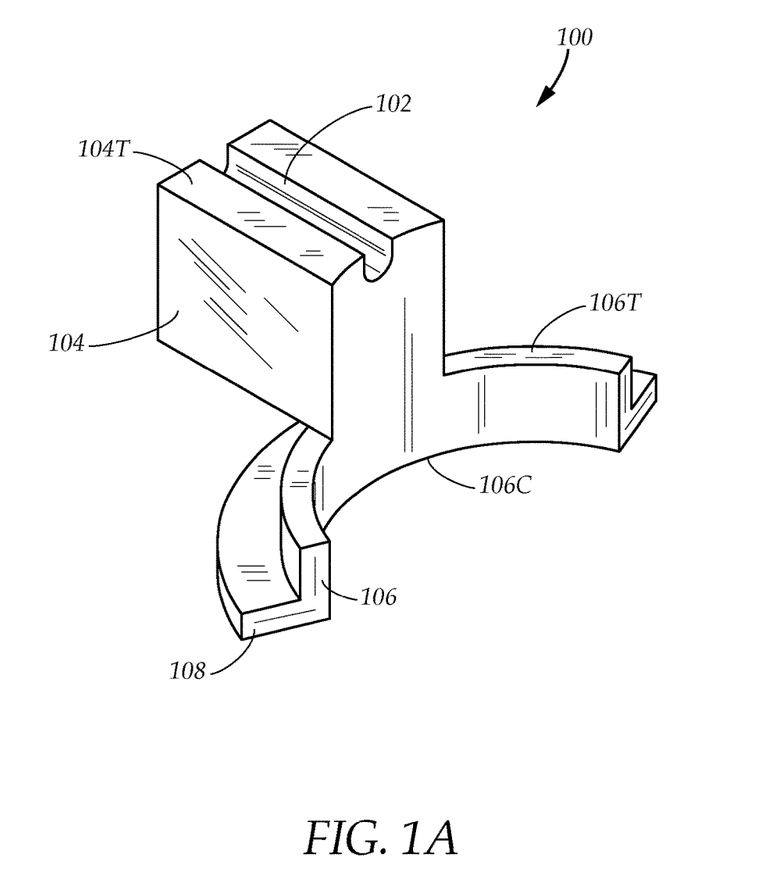
FIG. 1A is a perspective view of an example embodiment of a drill bit guide.
Figure 1B:
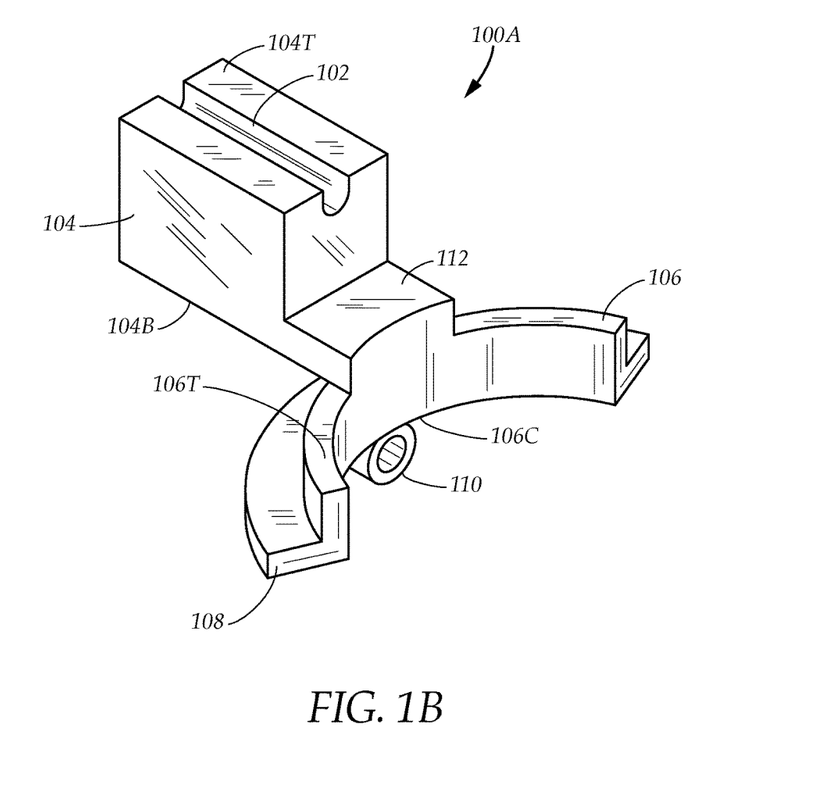
FIG. 1B, similar to FIG. 1A, is a perspective view of another example embodiment of a drill bit guide.
Figure 2:
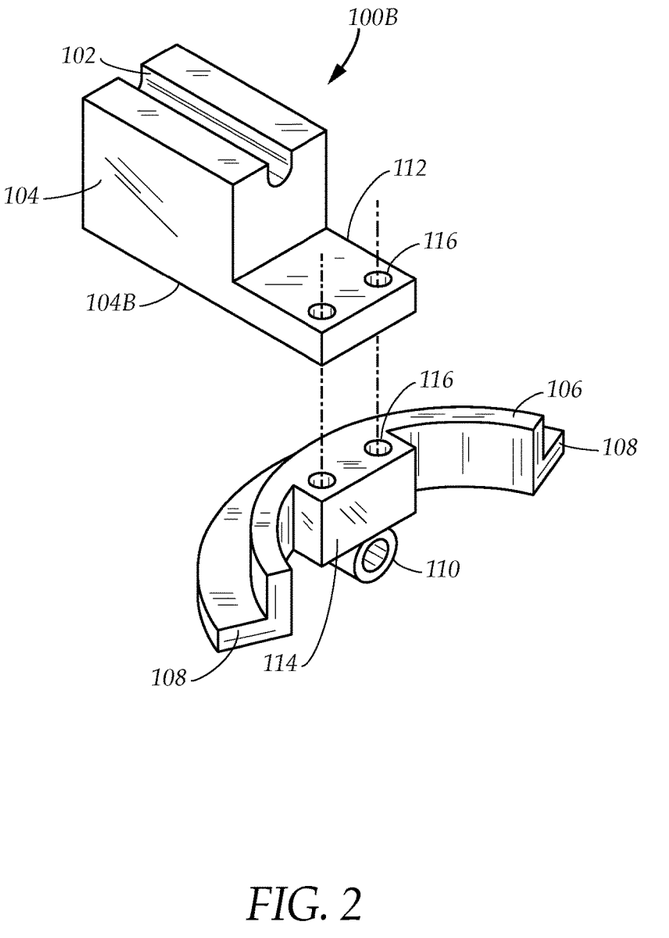
FIG. 2 is an exploded view of a further example embodiment of a drill bit guide.

The drill bit guide 100 is illustrated in FIGS. 1A, 1B and 2. The drill bit guide 100 has a block 104 having a guide channel 102 on the block top 104T.

The drill bit guide 100 has a rim guard 106 having a top surface 106T and a center 106C. The rim guard 106 is configured for protecting an edge of a light fixture opening during drilling. The block 104 attaches to the top surface 106T at the center 106C.

The drill bit guide 100 has a flange 108 at a right angle to the rim guard 106 configured for anchoring the drill bit guide 100 below a ceiling.

As shown in FIG. 1A, in one example embodiment, the drill bit guide 100 is a unitary piece, either welded, glued or molded.

In another example embodiment shown in FIG. 1B, the drill bit guide 100A has the block 104 having a guide channel 102 on the block top 104T. The block 104 has a bottom 104B with a platform portion 112. The platform portion 112 attaches to the top surface 106T of the rim guard 106. The platform portion sets the height above the ceiling so that any holes drilled using the drill bit guide are at a consistent height above the ceiling, preferably about one inch above the ceiling to the center of the hole formed by drilling.

Similar to other example embodiments, the flange 108 is at a right angle to the rim guard 106.

A laser conduit 110 is below the center 106C of the rim guard 106, the conduit configured for holding a laser pointer when aligning a pair of drill bit guides. Alternatively, the laser pointer is used to align with a target mark extending below a second hole or a wall.

In FIG. 2, shown in an exploded view, is another example embodiment of the drill bit guide 100B. Similarly, this guide 100B has block 104 having a top 104T and bottom 104B. The block has the guide channel 102 on the top 104T and the platform portion 112 on the bottom 104B.

The rim guard 106 has a connector 114 at the center 106C having at least one hole 116, preferably two. In the platform portion 112 are at least one hole 116, preferably two. A user matches the holes 116 and inserts a fastener to connect the block 104 to the rim guard 106. The fastener can be, for example but not limited to, a bolt, a screw, a cotter pin, a rivet or a peg. Such fasteners are well known to those of ordinary skill in the art and are not a limitation.

Figure 3:
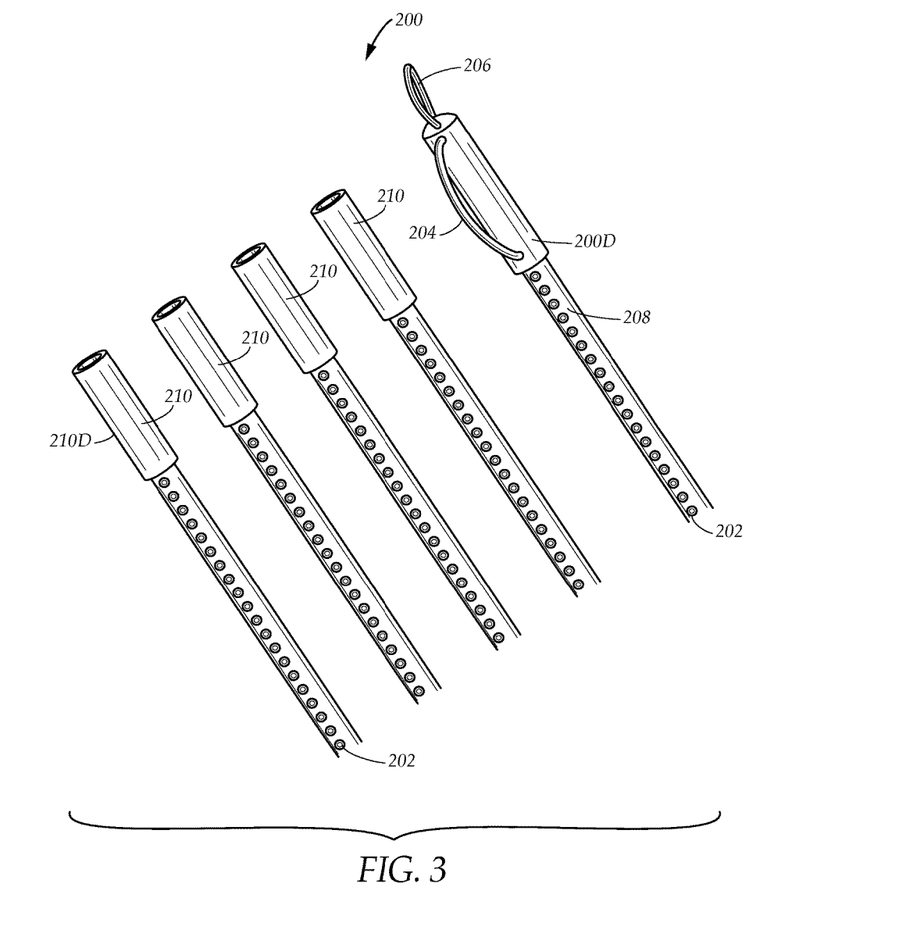
FIG. 3 is a perspective view of an example embodiment of a fish head rod and a plurality of extensions.

FIG. 3, as well as FIG. 4, shows an example embodiment of the fish head rod 200 of the kit 10. The fish head rod 200 has a distal top 200D with a loop 206, the loop for catching wire or cable. Below the loop 206 is a flexible arcuate guide strip 204 attaching to the distal end 200D of the rod 200. The guide strip 204 is preferably a thin metal strip.

On the rod is a longitudinal guide line 202 along a length of the rod 200 aligned with the guide strip 204. In the illustration, the guide line is a series of dots, but this is not a limitation but for illustrative purposes only. The line can be dashed, solid or aligned symbols. The purpose of the guide line 202 is to show the user below the ceiling that the arcuate guide strip 204 on the fish head rod 200 is in the proper position for pulling the wire or cable through the holes above the ceiling.

The fish head rod 200 further comprises at least one extension 210 having a longitudinal guide line 202. When an extension 210 attaches to the fish head rod 200, the guide line of the rod and the guide line of the extension 210 align to form a continuous guide line 202.

In one example the top distal loop 206 selectively opens and closes using spring tension.

The fish head rod 200 has a proximal end 200P configured for attaching the at least one extension 210 and the least one extension 210 has a first end 210P configured for attaching to the fish head rod and a second end configured for attaching to a further extension 210. The proximal end 200P of the fish head rod 200 has a connector such as threaded end. The first end 210P at least one extension 210 has a connector configured in a complementary manner to connect to the proximal end 200P of the fish head rod.

A plurality of extensions 210 are attachable to the fish head rod 200. The proximal end 200P of the fish head rod 200 and the ends 210E of the extensions 210 are marked to indicate the correct pairing of connectors such that the guide lines 202 are continuously aligned when the extensions are attached to the fish head rod.

For example, the extensions 210 may be numbered or letter, color-coded or marked in other ways to indicate the order of attachment known to those of ordinary skill in the art. The proximal end 210P may have a number, symbol, or color and the distal end of another extension 210 will have a matching number, symbol or color on the distal end 210D.

Figure 5:
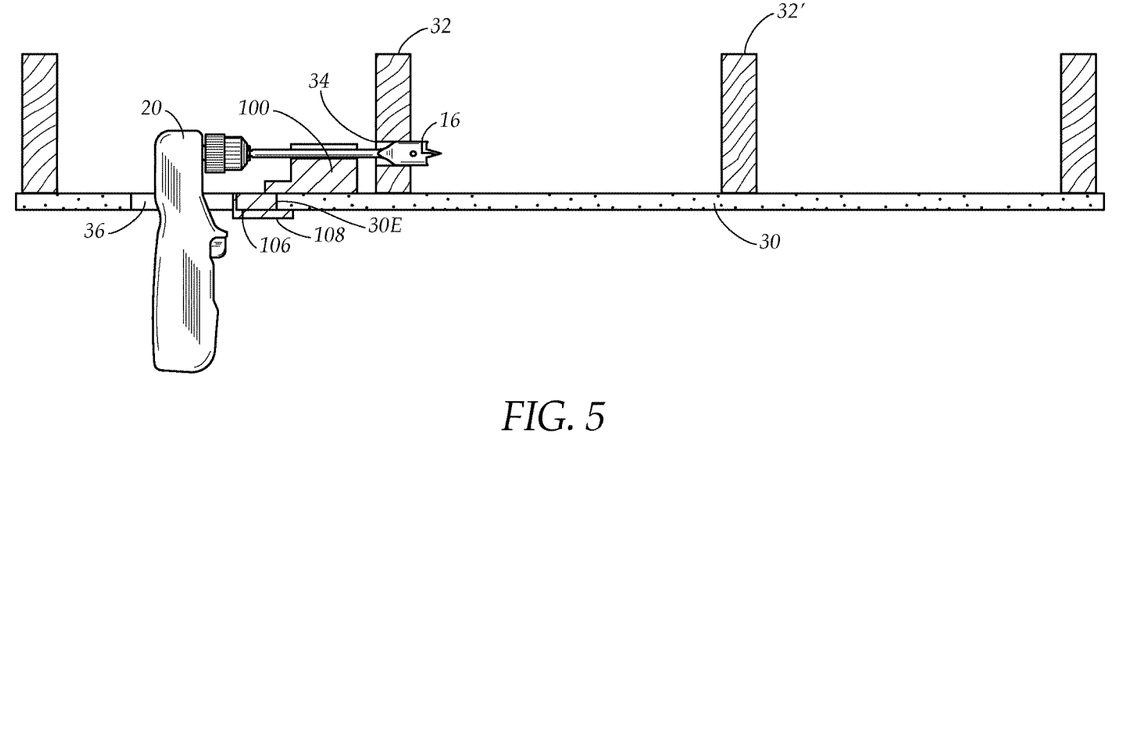
FIG. 5 is a side elevational view of an example embodiment of a drill of the kit drilling a hole in a joist using the drill bit guide of the kit through a ceiling shown in cutaway.
Figure 6:
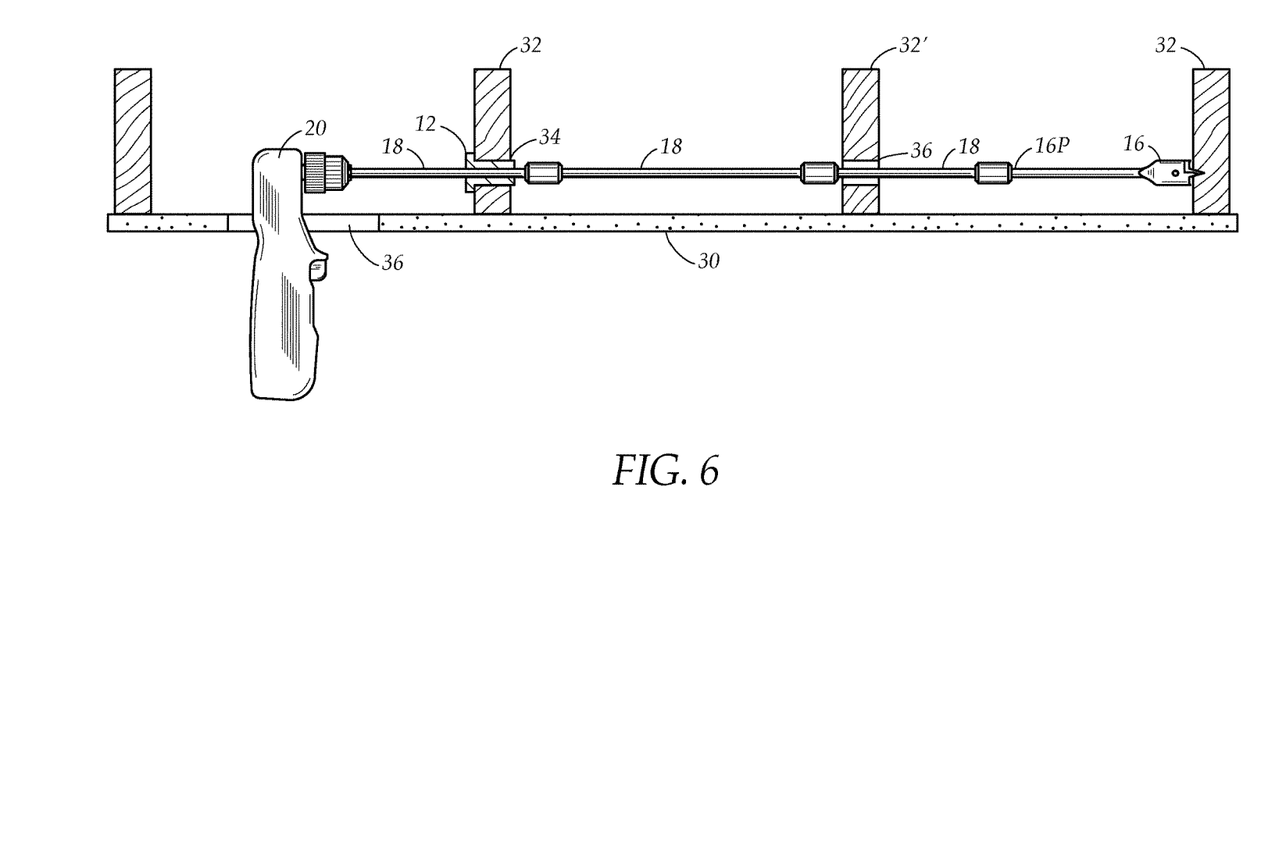
FIG. 6 is a side elevational view of an example embodiment of the drill of the kit drilling holes in adjoining joists through a ceiling shown in cutaway, using a plurality of drill bit extensions of the kit.
Figure 7:
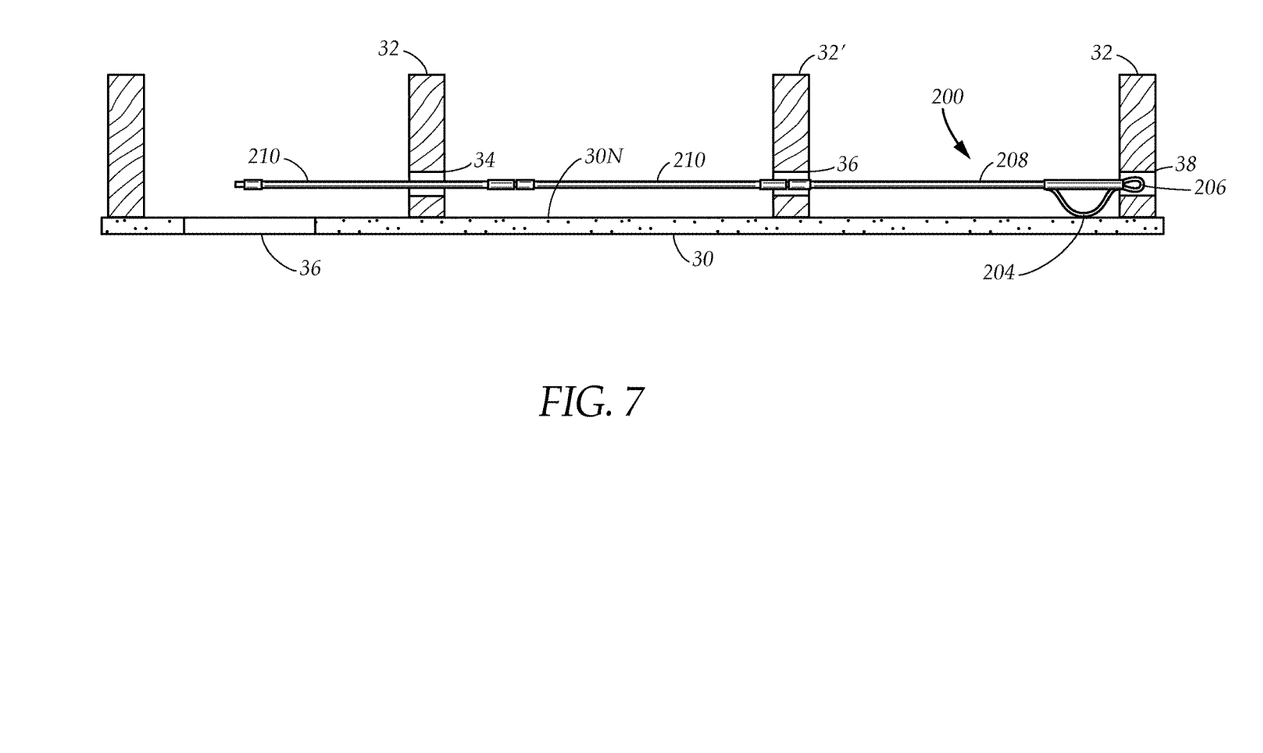
FIG. 7 is a side elevational view of an example embodiment of a fish head rod and a plurality of extensions pulling wire through the holes in the joists through a ceiling shown in cutaway.

FIGS. 5-7 illustrate an example embodiment of a method for running wire through a ceiling 30 using a kit 10 illustrated in FIG. 4 comprising a drill bit guide 100, a fish head rod 200 with a plurality of extensions 210, a drill with a right angle adaptor 20, a bit 16 and a plurality of drill bit extensions 18.

In FIG. 5, a user positions the drill bit guide 100 in a light fixture opening 36. The flange 108 sits below the ceiling 30, the rim guard 106 fits against the opening edge 36E. In one embodiment, the user clamps the drill bit guide 100 in place once it is in position. Note that a clamp is not shown to better show the drill bit guide in use, but are understood by those of ordinary skill.

The user, using a drill 20 with a right angle adapter, bores a hole 34 through a first joist 32 with a drill bit 16 attached to the drill 20 after positioning the drill bit 16 within the drill bit guide 100.

As shown in FIG. 6, once the hole 34 is in the first joist 32, the user detaches the drill bit 16 from the drill 20. The user then attaches at least one drill bit extension 18 to the proximal end 16P of the drill bit 16 and inserts the drill bit 16 and the at least one drill bit extension into the hole 34 in the first joist 32, allowing over a proximal end 18P of the at least one drill bit extension 18 to extend through the hole towards the drill 20. The user places the bushing 12 over the proximal end 18P of the at least one drill bit extension 18 and pushes the bushing 12 into the first hole 34. and attaches the at least one drill bit extension 18 to the drill 20.

As shown in FIG. 6, the user then bores a second hole 36 through a second joist 32'. If there are more joists 32 that must be bored, the user removes the first drill bit extension 18 from the drill 20, attaches a further drill bit extension 18 to the first drill bit extension and attaches the further extension to the drill. The user removes the bushing 12, places the drill bit 16 with the extensions 18 through the first hole 34 and replaces the bushing 12 into the first hole 34. This step is repeats as often as necessary until the path for a wire or cable to run through the ceiling is established. The holes 34, 36, 38 are aligned because the drill bit guide 100 guides the drill bit 16 to be a set distance above the ceiling 30 when boring the first hole 34. The bushing 12 stabilizes and guides the drill bit 16 and extensions 18 when boring subsequent holes 36, 38, keeping the drill bit 16 at the same set distance, preferably one inch as the set distance when the first hole 34 was bore.

When the path is complete, for example, when there is the path through the joists 32 is sufficiently complete such the wire can connect the lighting fixture in the opening 36, the user removes the drill 20, the drill bit 16, the drill bit extensions 18 and bushing 12 and sets them aside.

The user then pulls the wire through the holes, starting with the hole 38 furthest from the first hole 34, and each preceding hole until the second hole 36 and finally the first hole 34 using the fish head rod 200. When pulling the wire, the guide strip 204 rests on the interior surface 30N of the ceiling 30 at a consistent height, preferably one inch. The guide strip 204 stabilizes and guides the fish head rod 200 through the path formed by the holes 34, 36, 38.

Before pulling the wire, the user must attach the fish head rod extensions 210 to the fish head rod. The user aligns the extensions 210 so that guide line discussed hereinabove forms a continuous line. Because the guide line is configured to be seen from below the ceiling, it is not shown in FIG. 7.

The user looks through the fixture opening 36 and pulls the fish head rod 200 and extensions 210 visually making sure that the guide line is visible to the user and that the guide strip 204 traverses the interior surface of the ceiling 30.

Prior to drilling the holes, particularly when installing high hat fixtures, the user places a first drill bit guide 200 in a first fixture opening and places a second drill bit 200 guide in a second fixture opening. The user aligns the two drill bit guides using a laser pointer placed in the laser pointer guide 110 shown in FIGS. 1B and 2. The user then drills a first set of holes halfway between the openings using the first fixture opening and then drills the holes using the second fixture opening to connect to the a first set of holes with great assurance that all holes will align and the wire will pull through easily without further damage to the ceiling.

Throughout this disclosure, running or pulling wire as an example embodiment of the kit and the method of use thereof has referred to the ceiling. However, one of ordinary skill can visualize how this kit and method can be used in running wire inside a wall, similarly to the method used for running wire above the ceiling.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In conclusion, herein is presented a kit for running wire and cable. The disclosure is illustrated by example in the drawing figures, and throughout the written description. It should be understood that numerous variations are possible, while adhering to the inventive concept. Such variations are contemplated as being a part of the present disclosure.

What is claimed is:

1. A kit for running wire or cable through ceilings and walls, comprising:
   at least one drill bit guide;
   a fish head rod with at least one extension, the fish head rod and the at least one extension each having a longitudinal guide line so that connecting the at least one extension to and in alignment with the fish head rod forms a continuous longitudinal guide line, the fish head rod having a flexible arcuate guide strip; and
   at least one bushing.

2. The kit as described in claim 1, wherein the at least one drill bit guide has a channel in a block configured for guiding a drill bit.

3. The kit as described in claim 2, wherein the at least one drill bit guide has a flange configured for anchoring the drill bit guide under a ceiling.

4. The kit as described in claim 3, wherein the at least one drill bit guide has a rim guard configured for protecting an opening edge in a ceiling.

5. A fish head rod for pulling a wire or a cable, comprising:
   a rod having a top distal loop and a proximal connector;
   a flexible arcuate guide strip attaching to the distal end of the rod below the loop;
   a longitudinal guide line along a length of the rod aligned with the guide strip; and
   at least one extension having a longitudinal guide line, the guide line of the rod and the guide line of the at least one extension aligning to form a continuous guide line.

6. The fish head rod as described in claim 5, wherein the top distal loop selectively opens and closes using spring tension.

7. The fish head rod as described in claim 5, wherein the flexible arcuate guide strip is preferably metal.

8. The fish head rod as described in claim 5, wherein the fish head rod has a proximal end configured for attaching the at least one extension and the least one extension has a first end configured for attaching to the fish head rod and a second end configured for attaching to a further extension.

9. The fish head rod as described in claim 8, wherein a plurality of extensions is attached to the fish head rod, the distal end of the fish head rod and the ends of the extensions marked to indicate a correct pairing of a connectors such that the guide lines are continuously aligned when the extensions are attached to the fish head rod.

10. A drill bit guide for positioning a drill bit for drilling a hole in a ceiling joist, comprising:
    a block having a top and bottom, the block having a guide channel on the top and a platform portion on the bottom;
    a rim guard having a top surface and a center, the rim guard configured for protecting an edge of a light fixture opening during drilling, the platform portion of the block attaching to a top surface at the center; and
    a flange at a right angle to the rim guard configured for anchoring the drill bit guide below a ceiling.

11. The drill bit guide as described in claim 10, wherein a laser conduit is below the center of the rim guard, the conduit configured for holding a laser pointer when aligning the drill bit guide.

* * * * *